May 20, 1924.
E. H. ROY
1,494,978
DISHPAN AND COOKING UTENSIL
Filed March 29 1922
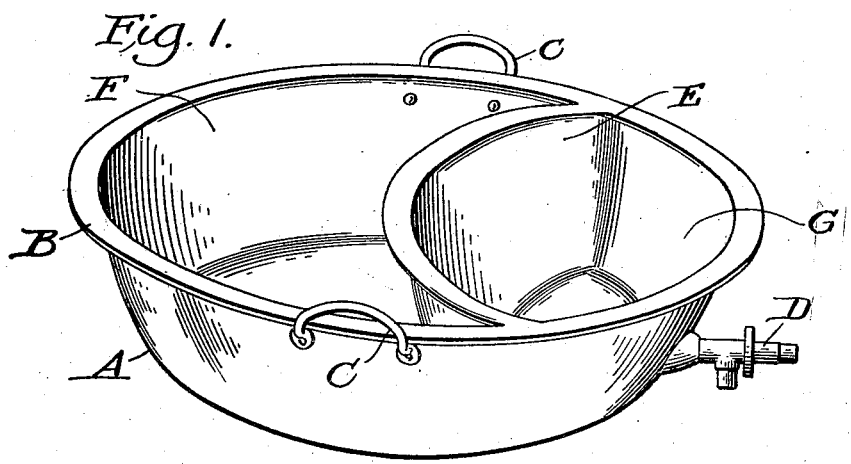
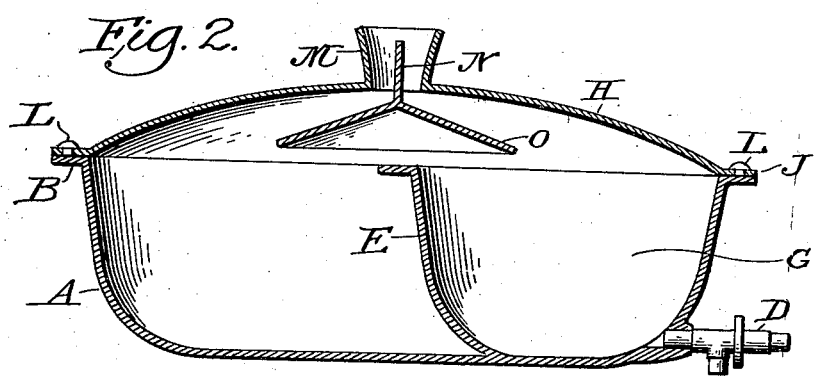
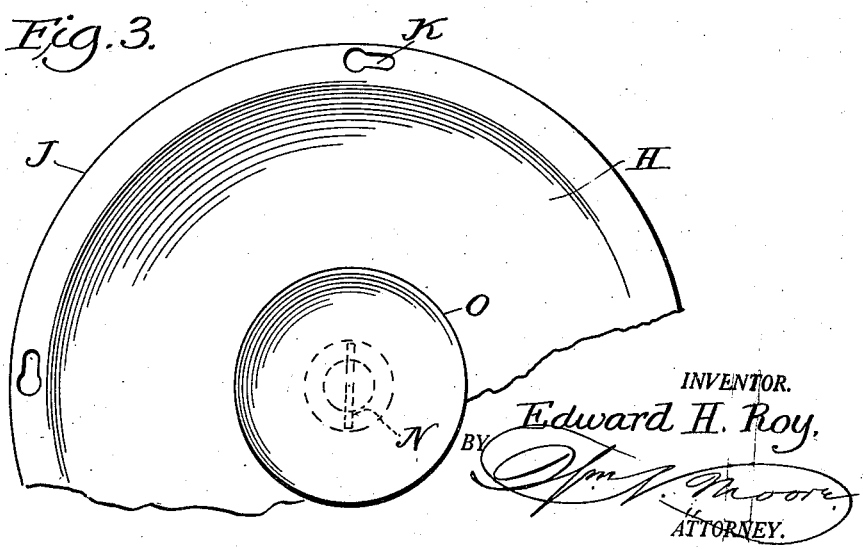
INVENTOR.
Edward H. Roy,
BY
ATTORNEY.

Patented May 20, 1924.

1,494,978

UNITED STATES PATENT OFFICE.

EDWARD H. ROY, OF NASHVILLE, TENNESSEE, ASSIGNOR OF TEN PER CENT TO VOLNEY JAMES, OF NASHVILLE, TENNESSEE.

DISHPAN AND COOKING UTENSIL.

Application filed March 29, 1922. Serial No. 547,690.

*To all whom it may concern:*

Be it known that I, EDWARD H. ROY, a resident of Nashville, in the county of Davidson and State of Tennessee, a citizen of the United States, have invented certain new and useful Improvements in Dishpans and Cooking Utensils, of which the following is a specification.

My invention relates to improvements in combined dishpan and cooking utensils, the main object of my invention being the provision of a kitchen utensil which can be used either in the cooking of food or for washing dishes, and which will perform both functions in an efficient and practical manner.

A further object of my invention is the provision of a utensil of the character and for the purposes stated which will be of the cheapest possible construction while possessing the requisites of a dish washer as well as a cooking utensil, to make its use highly desirable.

With these objects in view my invention consists of a utensil of the character and for the purposes stated embodying novel features of construction and combination of parts substantially as shown, described and particularly defined by the claim.

In order that the construction in detail and the manner of functioning of my article may be understood I have shown in the accompanying drawing a utensil constructed according to my improvement, and in said drawing:

Figure 1 represents a perspective view of a utensil embodying my invention in the form of a dish pan constructed to permit dish washing.

Fig. 2 represents a central sectional view showing the device provided with a cover adapted to be used in connection with the utensil, and Fig. 3 represents a bottom plan view of the cover.

The dish pan A of my invention is preferably of circular shape, provided with the broad brim B, the handles C, and the drain cock or spigot D, the pan being divided by the curved partition E, into the dish washing compartment F, and the draining compartment G, said compartment being of curved formation to best adapt them to receive and permit proper nesting of the dishes and other articles of cookery.

The invention may be used either for dish washing or for cooking purposes in the form shown in Fig. 1, or if desired the construction illustrated in Fig. 2 may be used, said construction employing a cover H, formed with a flange J, having bayonet slots K, to receive the lugs L, of the dish pan while said cover is provided with an entrance or inlet portion M, adapted to receive the hot water and having a division wall N, which delivers the water to the deflector O, which is of conical form and distributes the water to both of the compartments F and G, this form being capable of use in connection with an ordinary hot water faucet, the water therefrom effecting a thorough cleansing of the cookery in both compartments and being a highly desirable form of my invention.

The drawing illustrates the use of my invention with such clearness that further description is deemed unnecessary and it will be at once apparent that I provide at a very small cost a combined dish washing and cooking utensil which will perform its functions in a thoroughly efficient manner.

I claim:

As a new article of manufacture, a cooking and dish washing utensil, having a curved division wall or partition dividing said utensil into two curved compartments, and a cover for said utensil having a water inlet and means for conveying and distributing water to both compartments, said utensil and cover having flat rims fitting snugly together and formed with openings and fastenings to secure the cover and utensil.

In testimony whereof I hereunto affix my signature.

EDWARD H. ROY.